Patented Dec. 19, 1944

2,365,519

UNITED STATES PATENT OFFICE 2,365,519

PROCESS OF PREPARING SHRIMP FOR CANNING

Clyde H. Bloedorn, Chicago, Ill., assignor to Continental Can Company, Inc., New York, N. Y., a corporation of New York No Drawing. Application July 31, 1941, Serial No. 404,927

1 Claim. (Cl. 99—188)

The invention relates to a new and useful improvement in a process of preparing shrimp for canning. In the present practice of canning shrimp the picked meats of the shrimp are placed in wire baskets and the baskets then immersed in a boiling brine, salt solution. The blanching period normally varies from three to twelve minutes, during which time the baskets are agitated to ensure the release of the shrimp so as to permit the characteristic curling thereof. This soaking of the shrimp in the hot brine solution is injurious to the normal color and appearance of the shrimp meats in that the outer color retaining membrane of the shrimp is broken and disrupted thereby adversely effecting the color and appearance of the finished product and it also results in the leaching out of some of the desirable flavoring constituents. Furthermore, the agitation of the wire baskets to prevent matting of the shrimp and permit curling causes a breaking off of particles of flesh particularly in the region where the head is pinched from the shrimp and results in a clouded brine containing fines when the shrimp is packed in containers for the market.

An object of the present invention is to provide a process of blanching whereby the shrimp are contacted directly by steam for a period of time sufficient to fix the color and flavor and wherein the steam treatment takes place under conditions which permit the shrimp to readily take on its characteristic curl with or without agitation.

In the carrying out of the invention the heads are pinched off the shrimp and the shells removed thus producing what is usually referred to as the picked or shelled meats. The shrimp thus prepared is washed and is then distributed on an open mesh wire conveyor in a single loose layer. A continuously traveling conveyor passing through a steam chamber is preferably used. In the steam chamber and disposed both above and below the traveling conveyor are steam pipes with a plurality of holes for directing small jets of live steam directly into contact with the shrimp so that the shrimp is contacted with by the steam substantially from above and below. This steaming treatment continues for from five to twelve minutes. This direct impact of the steam against the shrimp results in a fixing of the color and also in a cooking of the shrimp meat so that it becomes firm and takes on its characteristic curl. Furthermore, by this contact of the steam directly with the shrimp there is no soaking or leaching which removes flavoring constituents and a much better flavor is retained in the shrimp product.

While it is preferred to direct the jets of steam directly onto the shrimp and this possibly aids in the curling of the shrimp, it will be understood that from certain aspects of the invention the conveyor with the shrimp thereon may be passed through a chamber containing an atmosphere of live steam so that the shrimp will come in direct contact with the steam without the use of the jets which strike the shrimp.

The shrimp as stated above is laid more or less loosely on the conveyor, which greatly facilitates its curling and the individual treatment of the shrimp produces a blanched product which is substantially free from loose particles which are likely to cloud the brine in which the shrimp are packed in containers for the market.

After the shrimp has been blanched by the steam process described above, it is cooled and graded if desired and may then be placed directly in the containers in a brine solution and the containers sealed preparatory to the processing of the canned shrimp.

It may be desirable to place the shrimp in a cold or room temperature brine solution before blanching and when this step is included, the shrimp may be flumed through the brine solution, covered with brine in buckets, or may be placed in wire baskets and the wire baskets in turn placed in a brine solution. Such a pre-brine treatment tends to remove a normal external sliminess of the meats thereby facilitating subsequent handling operations which include grading and filling into containers.

The essentially novel feature in the process described consists in the subjecting of the shrimp to the steam treatment for blanching, and it is obvious that many changes may be made in the steps used in the preparing of the shrimp for blanching and also in the treatment of the shrimp after blanching prior to canning.

I claim:

The process of preparing shrimp for canning which consists in removing the head and shell, spreading the shrimp after washing in a single loose layer on an open mesh traveling conveyor thereby presenting maximum surface for direct steam contact and freedom to curl, subjecting the shrimp on the conveyor to direct contact jets of live steam from above and from below for a period of from five to twelve minutes for fixing the color and flavor and for firming the meat and curling the shrimp, and packing and sealing the shrimp in a container in a brine solution.

CLYDE H. BLOEDORN.